United States Patent [19]
Yagi et al.

[11] 4,110,314
[45] Aug. 29, 1978

[54] PROCESS FOR PREPARING AN AROMATIC POLYMER IN THE PRESENCE OF AN INERT NONPOLAR AROMATIC REACTION LUBRICANT

[75] Inventors: Norio Yagi; Hideki Matsumura; Tatsuhiro Aoyagi; Ikuji Kishi, all of Machida, Japan

[73] Assignee: Denki Kagaku Kogyo Kabushiki Kaisha, Tokyo, Japan

[21] Appl. No.: 751,479

[22] Filed: Dec. 16, 1976

[30] Foreign Application Priority Data

Dec. 19, 1975 [JP] Japan .................................. 50-151301

[51] Int. Cl.$^2$ ........................ C08G 65/40; C08G 75/23
[52] U.S. Cl. ........................................ 528/26; 528/125; 528/174; 528/219
[58] Field of Search ..................... 260/49, 50, 61, 47 R

[56] References Cited

U.S. PATENT DOCUMENTS

| 3,886,120 | 5/1975 | Yagi et al. | 260/49 |
| 4,010,147 | 3/1977 | Rose | 260/79.3 M |

*Primary Examiner*—Lester L. Lee
*Attorney, Agent, or Firm*—Oblon, Fisher, Spivak, McClelland & Maier

[57] ABSTRACT

An aromatic polymer is prepared by polymerizing a diphenolate compound, of a dialkali metal salt of a diphenol with a dihalodiphenyl compound, of a dihalogenobenzenoid compound having an electron withdrawing group in at least one of the positions ortho or para to each of the halogen atoms, at 200° to 400° C in the presence of from 0.1 to 30% by weight of an inert nonpolar aromatic reaction lubricant.

6 Claims, No Drawings

PROCESS FOR PREPARING AN AROMATIC POLYMER IN THE PRESENCE OF AN INERT NONPOLAR AROMATIC REACTION LUBRICANT

BACKGROUND OF THE INVENTION

1. Field of the Invention

The present invention relates to an improved process for preparing an aromatic polymer which has excellent heat resistance and thermal stability and improved color. More particularly, it relates to a process for preparing the aromatic polymer at remarkably improved reaction velocity.

2. Description of Prior Art

It has been known to prepare an aromatic polymer by reacting a dialkali metal salt of diphenol with a dihalogenobenzenoid compound containing an electron withdrawing group in at least one position ortho or para to each of the halogen atoms in the absence of a solvent, in U.S. Pat. No. 3,886,120.

Although the aromatic polymer having good heat resistance and thermal stability and improved color can be obtained by the process, the reaction velocity has been remarkably slow. Accordingly, it has the disadvantage that the reaction should be carried out by mixing the mixture having high viscosity for a long period. When the process is worked in an industrial scale, the disadvantage has been serious and sometimes it has been fatal.

It has been also known to prepare the aromatic polymers by solution polymerization in an anhydrous polar solvent such as dimethyl sulfoxide, dimethyl sulfone or tetrahydrothiophene-1,1-dioxide (British Pat. No. 1,078,234) or dimethyl acetamide, tetramethyl urea or hexamethyl phosphamide (Japanese Pat. No. 18146/1971). These processes can be advantageously worked in an industrial scale by relatively easy operation from the viewpoint of equipments.

However, the aromatic polymers prepared by these processes have brown color, so that the light transmittance of polymers are relatively low. Accordingly, the polymers had no advantage of transparent polymer and the appearance which is one of the important values as commercial resins has been substantially lost.

SUMMARY OF THE INVENTION

One object of the present invention is to provide a process for preparing an aromatic polymer having excellent heat resistance and thermal stability and improved color, which can be worked in an industrial scale by relatively easy operation.

Another object of the invention is to provide a process for preparing the aromatic polymer at high reaction velocity.

These objects of the present invention can be attained by preparing an aromatic polymer which comprises polymerizing a diphenolate compound, of a dialkali metal salt of a diphenol with a dihalodiphenyl compound, of a dihalogenobenzenoid compound having an electron withdrawing group in at least one position ortho or para to each of the halogen atoms, at 200° to 400° C in the presence of from 0.1 to 30% by weight of an inert nonpolar aromatic reaction lubricant.

DETAILED DESCRIPTION OF THE PREFERRED EMBODIMENTS

The process of the present invention is an improvement of the process of U.S. Pat. No. 3,886,120, wherein an aromatic polymer is prepared by bulk polymerizing a diphenolate compound, of a dialkali metal salt of a diphenol with a dihalodiphenyl compound, of a dihalogenobenzenoid compound containing an electron withdrawing group in at least one position ortho or para to each of the halogen atoms, at 200° to 400° C in the absence of a solvent.

In the process of the invention, the inert nonpolar aromatic reaction lubricant is added, which is stable and does not react to the raw materials at the reaction temperature.

The polymers prepared by the process of the present invention have excellent heat resistance, oxidation resistance and chemical resistance so that which are especially useful as raw materials for heat resistant paints and adhesive compositions. The high molecular weight polymers are especially important as thermoplastic polymers which have excellent mechanical strength and heat resistance, oxidation resistance and chemical resistance. For these applications, polymers with minimal color and excellent thermal stability are especially valuable.

The diphenolate compound (di-alkali metal salt of a diphenol compound) can be derived from compounds with a single nuclear phenylene group, such as hydroquinone, resorcinol, or the like, and compounds with a polynuclear phenylene group. It is especially preferable to use di-alkali metal salts of bisphenols, such as 2,2-bis-(4-hydroxyphenyl) propane, 2,4'-dihydroxydiphenylmethane, 3,3-bis-(4-hydroxyphenyl) pentane, 4,4'-dihydroxydiphenylsulfone, 2,4'-dihydroxydiphenylsulfone, 4,4'-dihydroxybenzophenone, 2,4'-dihydroxybenzophenone, 1,1-bis-(4-hydroxyphenyl) cyclohexane, 4,4'-dihydroxydiphenyl, 2,4'-dihydroxydiphenyl, or the like, are especially preferable. The dialkali metal salt is preferably a disodium or dipotassium salt, which are the most economical.

The diphenolate compound is prepared by dissolving a diphenol in an aqueous solution of an equivalent amount of an alkali metal hydroxide. Solid diphenolate is prepared by concentrating and drying the aqueous solution. The diphenolate may be prepared by other conventional processes.

The dihalogenobenzenoid compound has two halogen atoms bonded to the benzene rings and an electron withdrawing group in at least one of the positions ortho or para to the halogen atoms. The halogen atom is preferably chlorine, which is highly reactive and economical. The purpose of the electron withdrawing group is to activate the halogen atom ortho or para to the electron withdrawing group, thereby promoting the condensation reaction of the dihalogenobenzenoid compound with the diphenolate compound with elimination of an alkali metal halide.

Suitable dihalogenobenzenoid compounds include 4,4'-dichlorodiphenylsulfone, 2,4'-dichlorodiphenylsulfone, 4,4'-dichlorobenzophenone, 2,4'-dichlorobenzophenone, or the like. A mixture of diphenolate compounds and a mixture of dihalogenobenzenoid compounds may be used.

The condensation reaction may be carried out by reacting the diphenolate compound with the dihalogenobenzenoid compound, at 200° – 400° C in the presence of the inert nonpolar aromatic reaction lubricant, by dealkalimetalhalogenation.

The reaction should be carried out in the absence of oxygen, and it can be carried out in an inert gas atmosphere such as nitrogen, helium, or the like.

The inert nonpolar aromatic reaction lubricants should be inert and stable in the reaction conditions.

Suitable inert nonpolar aromatic reaction lubricants include the compounds having the formula

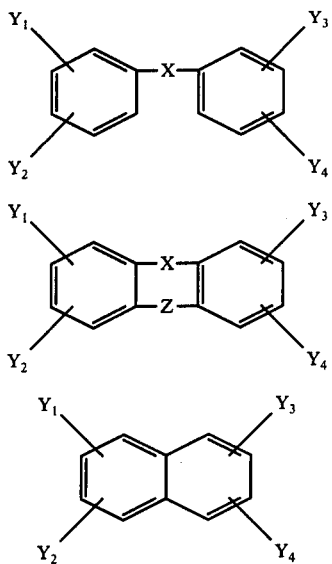

wherein X represents a single bond or methylene, ethylene, propylene or propylidene group or oxygen or sulfur atom;

$Y_1$, $Y_2$, $Y_3$ and $Y_4$ respectively represent hydrogen atom or methyl, ethyl, methoxy, ethoxy, aryl or benzyl group and Z represents methylene group or oxygen or sulfur atom, and also include anthracene and phenanthrene.

It is especially preferable to use aromatic hydrocarbons such as biphenyl, diphenylmethane, 1,1-diphenylethane, 1,2-diphenylethane, 2,2-diphenylpropane, methyldiphenyls, ethyldiphenyls, dibenzyltoluene, naphthalene, and alkylnaphthalenes e.g. methylnaphthalene, ethylnaphthalene and; terphenyls, hydrogenated terphenyls, anthracene, phenanthrene; and aromatic ethers such as diphenyl ether and dialkyl diphenyl ethers e.g. dimethyldiphenyl ethers, methylphenyl ethylphenyl ethers, diethyl diphenyl ethers, and phenyl naphthyl ethers and diphenyl thioethers.

When the compound is added in the reaction mixture, the compound acts as a lubricant to remarkably decrease the viscosity of the reaction mixture. Moreover, the reaction velocity for the polycondensation is remarkably increased as unexpectable phenomenon and the reaction velocity is several to ten and several times faster than the reaction velocity in the absence of the compound.

When high molecular weight polymer is prepared, the effect of the inert nonpolar aromatic reaction lubricant is remarkably high.

The amount of the inert nonpolar aromatic reaction lubricant is dependent upon the type of the starting materials, the polycondensation degree of the object polymer and the reaction temperature and is usually in a range of 0.1 to 30 wt.% preferably 1 to 20 wt.% to total of the diphenolate and the dihalogenobenzenoid.

When the amount of the compound is less than 0.1 wt.%, the effect is too low whereas when the amount of the compound is higher than 30 wt.%, the effect is not substantially improved by the further addition. It is possible to react them even though it is less than 0.1 wt.% or more than 30 wt.%.

The molar ratio of the diphenolate to the dihalogenobenzenoid can be selected as desired. When high molecular weight polymer is prepared, it is preferable to select the molar ratio in a range of 1:0.95 to 1:1.10.

These starting materials can be added at once at the initiation of the reaction and can be also added in sequence during the reaction.

The reaction is carried out at 200° to 400° C. The optimum reaction temperature is dependent upon the types and amounts of both of the starting materials and the reaction lubricant, and it is usually in a range of 230° to 330° C.

When it is lower than 200° C, the reaction velocity is too slow whereas when it is higher than 400° C, the thermal deterioration of the resulting polymer or the additives is disadvantageously caused.

The polycondensation by heating the reaction mixture can be carried out without stirring however, it is preferably carried out under stirring the mixture. When the inert nonpolar aromatic reaction lubricant is added, the viscosity of the reaction mixture is remarkably lowered whereby it is possible to employ the conventional reactor for agitating high viscosity solution. When the reaction mixture is agitated, the temperature in the reaction mixture can be uniform and the reaction can be performed at high reaction velocity.

The alkali metal halide formed in the polycondensation can be removed by extracting with water from the polymer after the reaction.

The alkali metal halide can be also removed by dissolving the polymer in an organic solvent such as dimethylsulfoxide, dimethyl formamide, tetrachloroethane, etc. and pouring the resulting solution into a nonsolvent which does not dissolve the polymer but is miscible with the solvent, such as water, methanol, acetone, etc. to precipitate the polymer and washing the precipitated polymer with water.

The invention will be further illustrated by certain examples.

In the examples, the thermal stability of the polymer was evaluated as follows:

The polymer sample was heated at 320° C for two hours in a hot press and the change of $\eta inh$ and the weight percent of gel formation during heat treatment were measured in order to evaluate the thermal stability. In the examples, viscosity $\eta inh$ is given by the equation $$\eta inh = 1/C \cdot \log_e (ts - to/to)$$

wherein $ts$: efflux time of polymer solution;

$to$: efflux time of solvent;

C: concentration of polymer solution (g/100 ml). The viscosity was measured at 30° C using 1,1,2,2-tetrachloroethane as a solvent in an Ubbelohde viscometer. The concentration of the polymer solution was 0.5 g/100 ml. The color degree of the polymer was obtained by measuring the transmittance of visible light of 400 – 800 m$\mu$ at intervals of 50 m$\mu$ through a transparent sample plate having a thickness of 1 mm, and then calculating the average transmittance.

The melt viscosity was measured by the melt flow indexer manufactured by Toyo Seiki K.K. under the Japanese Industrial Standard K 6760, at the constant shear stress of 95.3 dyne/cm$^2$. The melt viscosity is given by the equation $$\eta\text{app} = (\tau/\dot{\gamma}) = \pi\Delta P\gamma^4/8LQ$$

$\tau$ : shear stress
$\dot{\gamma}$ : shear velocity
$\Delta P$ : load weight
$\gamma$ : diameter of orifice
$L$ : length of orifice
$Q$ : discharging rate

EXAMPLE 1

In a mortar, 32.65 g (0.1 mole) of 4,4'-dipotassium salt of dihydroxydiphenylsulfone and 28.72 g (0.1 mole) of 4,4'-dichlorodiphenylsulfone were mixed and ground to obtain a mixture of fine particles. The mixture was placed in a stainless steel autoclave equipped with a stirrer and then 0.6 g of biphenyl was charged.

The autoclave was purged with nitrogen by repeating vacuum and flushing with nitrogen, and was heated in an electric furnace. The mixture was heated at 300° C for 3 hours with stirring. After cooling the reaction mixture, tetrachloroethane was charged in the autoclave to dissolve the polymer and the solution was taken out. The solution of the polymer was filtered and poured into a mixture of 90 wt.% of methanol and 10 wt.% of water to precipitate the polymer. The precipitated polymer was washed with methanol and then with water and then was dried at 100° C under vacuum for one day and night.

According to the infrared spectral analysis and NMR analysis, the polymer contained units having the formula

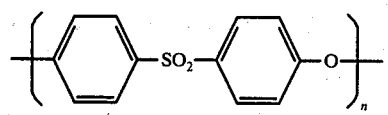

The polymer had a viscosity $\eta$inh of 0.486, and the polymer heated at 320° C for 2 hours gave a viscosity $\eta$inh of 0.487, and had no gel component. The average light transmittance was 86%.

EXAMPLE 2

The process of Example 1 was repeated except using 6.0 g of each of diphenyl ether, m-terphenyl, naphthalene and diphenyl thioether instead of biphenyl. The resulting polymers had the following properties.

| Reaction accelerator | $\eta$ inh | Average light transmittance (%) |
|---|---|---|
| diphenyl ether | 0.481 | 84 |
| m-tarphenyl | 0.461 | 85 |
| naphthalene | 0.482 | 85 |
| diphenyl thioether | 0.456 | 83 |

EXAMPLE 3

In the stainless steel autoclave of Example 1, 29.42 g (0.1 mole) of fine powdery disodium salt of 4,4'-dihydroxydiphenylsulfone and 28.72 g (0.1 mole) of 4,4'-dichlorodiphenylsulfone and 6.0 g of biphenyl were charged and the mixture was stirred in nitrogen gas atmosphere at 300° C for 5 hours. The reaction mixture was treated by the process of Example 1 to obtain the purified polymer. The polymer had viscosity $\eta$inh of 0.418 and an average light transmittance of 80%.

EXAMPLE 4

The process of Example 1 was repeated except varying the amount of biphenyl.

The properties of the resulting polymers are as follows.

| Amount of biphenyl (%) | $\eta$ inh | Average light transmittance (%) |
|---|---|---|
| 0.05 | 0.320 | 87 |
| 0.1 | 0.389 | 84 |
| 0.5 | 0.403 | 86 |
| 1 | 0.434 | 85 |
| 5 | 0.475 | 86 |
| 10 | 0.493 | 85 |
| 20 | 0.488 | 84 |
| 30 | 0.512 | 82 |
| 40 | 0.501 | 80 |

Reference 1

The process of Example 1 was repeated except using no biphenyl. The polymer obtained after maintaining the mixture at 300° C for 2 hours with stirring, had a viscosity $\eta$inh of 0.175. The molecular weight of the polymer was quite low. The mixture was further maintained at 300° C for 10 hours with stirring. After about 8 hours from the initiation of the reaction, the stirring become quite difficult. The resulting polymer had a viscosity $\eta$inh of 0.391 and the polymer heated further at 320° C for 2 hours gave the substantially same viscosity $\eta$inh of 0.390 and had no gel component. The average light transmittance was 84%.

Reference 2

In a 250 ml separable flask equipped with a stirrer, a thermometer, a water cooling condenser and a water trap, 12.52 g (0.05 mole) of 4,4'-dihydroxydiphenylsulfone, 12.5 ml (KOH 0.1 mole) of 8N-KOH aqueous solution and 75 ml of tetrahydrothiophene-1,1-dioxide (referring to as Sulfolan) which was purified by distillation and 50 ml of xylene were charged in nitrogen gas atmosphere, and the flask was purged with nitrogen. The mixture was heated under refluxing for 4 hours to remove water from the reaction mixture as azeotropic mixture of xylene, whereby dipotassium salt of 4,4'-dihydroxydiphenylsulfone was formed in an anhydrous mixture of Sulfolan and xylene.

The mixture was cooled to 45° C, and 14.36 g (0.05 mole) of 4,4'-dichlorodiphenylsulfone was added to the solution in the nitrogen gas atmosphere. The reaction mixture was heated at 240° C with vigorously stirring. Xylene was substantially distilled off before reaching at 170° C. The reaction mixture was maintained at 240° C for 3.75 hours and then it was cooled to 160° C and a small amount of methyl chloride was added to terminate the terminal reaction.

After cooling it at 50° C, the reaction mixture was poured into 2 liters of ethanol to precipitate the polymer. The polymer was washed and dried at 100° C in vacuum for one day and night.

According to the infrared spectral analysis and NMR analysis, the resulting polymer had the same structure with the polymer of Example 1. The polymer had a viscosity $\eta$inh of 0.47 and brown color and an average light transmittance of 46%. The polymer heated at 320° C for 24 hours had the gel component of 45% and a viscosity $\eta$inh of the polymer dissolved in tetrachloroethane was 0.62.

EXAMPLE 5

The process of Example 1 was repeated except that 29.05 g (0.1 mole) of dipotassium salt of 4,4'-dihydroxydiphenyl ketone, 28.72 g (0.1 mole) of 4,4'-dichlorodiphenylsulfone and 6.82 g of biphenyl were used and to purify the polymer.

According to the infrared spectral analysis and NMR analysis, the polymer contained units having the formula

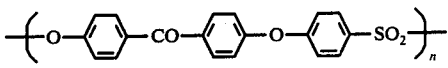

The polymer had a viscosity ηinh of 0.551 and an average light transmittance of 85%. The polymer heated at 320° C for 2 hours gave a viscosity ηinh of 0.551 and had no gel component.

EXAMPLE 6

In the stainless steel autoclave of Example 1, 30.44 g (0.1 mole) of dipotassium salt of 2,2-bis-(4-hydroxyphenyl) propane, 28.72 g (0.1 mole) of 4,4'-dichlorodiphenylsulfone and 6.0 g of biphenyl were charged and the mixture was heated at 230° C for 2 hours with stirring in nitrogen gas atmosphere. The resulting polymer was purified by the process of Example 1 to obtain a purified polymer.

According to the infrared spectral analysis and NMR analysis, the polymer contained units having the formula

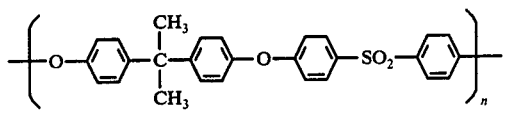

The polymer had a viscosity ηinh of 0.393. The film formed by pressing the polymer was transparent and had remarkably pale color.

EXAMPLE 7

In order to test the effect of the inert nonpolar aromatic reaction lubricant for decreasing the viscosity of the reaction mixture, each specific amount of biphenyl was added to the aromatic polymer prepared by the process of Reference 1. (ηinh = 0.390), and the melt viscosity of the mixture was measured at various temperature. The results are shown in the following table.

| Amount of biphenyl (%) | $10^{-4} \eta_{app}$ (poise) | | |
|---|---|---|---|
| | 260° C | 300° C | 320° C |
| 0 | 340 | 49 | 17 |
| 1 | 120 | 19 | 7 |
| 3 | 60 | 9 | 4 |
| 7 | 17 | 1.5 | 0.6 |
| 15 | 1.7 | 0.2 | — |

As it is clear from the table, the melt viscosity was decreased to about ½, 1/5, 1/20, and 1/200 respectively by the addition of 1%, 3%, 7% and 15% of biphenyl.

What is claimed is:

1. A process for preparing an aromatic polymer which comprises polymerizing a dialkali metal salt of a diphenol with a dihalodiphenyl compound, having an electron withdrawing group in at least one of the positions ortho or para to each of the halogen atoms, at 200° C to 400° C, in an inert gas atmosphere, in the presence of from 0.1 to 30% by weight of an inert nonpolar aromatic reaction lubricant selected from the group consisting of anthracene, phenanthrene and a compound of the formula

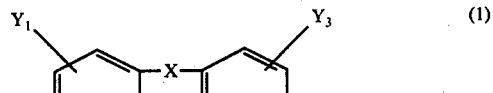

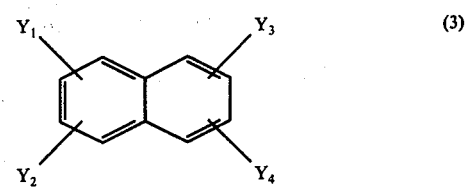

wherein
X represents a single bond or methylene, ethylene, propylene or propylidene group or oxygen or sulfur atom;
$Y_1$, $Y_2$, $Y_3$ and $Y_4$ respectively represent hydrogen atom or methyl, ethyl, methoxy, ethoxy, aryl or benzyl group and
Z represents methylene group or oxygen or sulfur atom;
wherein said dialkali metal salt of a diphenol and said dihalodiphenyl compound are polycondensed in the molar ratio of from 1:0.95 to 1:1.10.

2. The process of claim 1 wherein said alkali metal salt of a diphenol has the formula

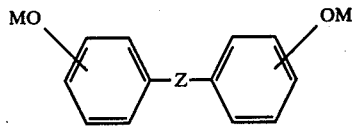

wherein M represents an alkali metal atom and Z represents —$SO_2$—, —CO— or a $C_{1-5}$ alkylene group, and the —OM group is ortho or para to Z; and said dihalodiphenyl compound has the formula

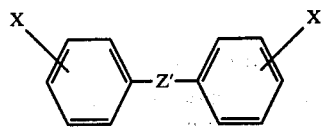

wherein X represents a halogen atom and Z' represents —$SO_2$— or —CO—, and X is ortho or para to Z'.

3. The process of claim 1, wherein said dialkali metal salt of a diphenol is the disodium or dipotassium salt of a diphenol containing a single or a polynuclear phenyl group.

4. The process of claim 1, wherein said dihalodiphenyl compound is 4,4'-dichlorodiphenylsulfone, 2,4'-dichlorodiphenylsulfone, 4,4'-dichlorobenzophenone, 2,4'-dichlorobenzophenone, or a mixture thereof.

5. The process of claim 1, wherein said inert nonpolar aromatic reaction lubricant is biphenyl, diphenyl ether, m-terphenyl, naphthalene or diphenyl thioether.

6. The process of claim 1, wherein said dialkali metal salt of a diphenol is selected from the group consisting of
di-alkali metal salts of 2,2-bis-(4-hydroxyphenyl) propane,
2,4'-dihydroxydiphenylmethane, 3,3-bis-(4-hydroxyphenyl) pentane,
4,4'-dihydroxydiphenylsulfone, 2,4'-dihydroxydiphenylsulfone,
4,4'-dihydroxybenzophenone, 2,4'-dihydroxybenzophenone, 1,1-bis-(4-hydroxyphenyl) cyclohexane, 4,4'-dihydroxydiphenyl, 2,4'-dihydroxydiphenyl, and mixtures thereof;
and said dihalodiphenyl compound is selected from the group consisting of
4,4'-dichlorodiphenylsulfone, 2,4'-dichlorodiphenylsulfone,
4,4'-dichlorobenzophenone, 2,4'-dichlorobenzophenone, and mixtures thereof; and said inert nonpolar aromatic reaction lubricant is selected from the group consisting of biphenyl, diphenylmethane, 1,1-diphenylethane, 1,2-diphenylethane, 2,2-diphenylpropane, methyldiphenyls, ethyldiphenyls, dibenzyltoluene, naphthalene, alkylnaphthalenes, terphenyls, hydrogenated terphenyls, anthracene, phenanthrene, diphenyl ether, dialkyl diphenyl ethers, phenyl naphthyl ethers and diphenyl thioethers.

* * * * *